United States Patent
Chen et al.

(10) Patent No.: US 10,802,961 B2
(45) Date of Patent: Oct. 13, 2020

(54) DATA STORAGE DEVICE AND OPERATION METHOD OF THE SAME

(71) Applicant: RAYMX Microelectronics Corp., Hefei (CN)

(72) Inventors: Yen-Chung Chen, Hefei (CN); Chih-Ching Chien, Hefei (CN); Li-Chun Huang, Hefei (CN); Han-Ting Tsai, Hefei (CN); Wei-Ren Hsu, Hefei (CN)

(73) Assignee: RAYMX MICROELECTRONICS CORP., Hefei, Anhui Province (CN)

( * ) Notice: Subject to any disclaimer, the term of this patent is extended or adjusted under 35 U.S.C. 154(b) by 0 days.

(21) Appl. No.: 16/366,051

(22) Filed: Mar. 27, 2019

(65) Prior Publication Data
US 2019/0303286 A1   Oct. 3, 2019

(30) Foreign Application Priority Data

Mar. 29, 2018 (TW) ............................... 107111047 A

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0658* (2013.01); *G06F 3/0673* (2013.01)

(58) Field of Classification Search
None
See application file for complete search history.

(56) References Cited

U.S. PATENT DOCUMENTS

| 8,392,649 B2 | 3/2013 | Yeh | |
|---|---|---|---|
| 2014/0347936 A1* | 11/2014 | Ghaly | G11C 16/10 365/185.18 |
| 2016/0148702 A1* | 5/2016 | Karakulak | G11C 16/26 365/185.12 |
| 2017/0185337 A1* | 6/2017 | Lee | G06F 3/0629 |

FOREIGN PATENT DOCUMENTS

| TW | 200937192 | 9/2009 |
|---|---|---|
| TW | 201222256 A1 | 6/2012 |

OTHER PUBLICATIONS

Ming-Chang Yang, Yuan-Hao Chang, Che-Wei Tsao and Po-Chun Huang, "New ERA: New efficient reliability-aware wear leveling for endurance enhancement of flash storage devices," 2013 50th ACM/EDAC/IEEE Design Automation Conference (DAC), Austin, TX, 2013, pp. 1-6. (Year: 2013).*

* cited by examiner

*Primary Examiner* — Edward J Dudek, Jr.
*Assistant Examiner* — Ralph A Verderamo, III
(74) *Attorney, Agent, or Firm* — McClure, Qualey & Rodack, LLP

(57) ABSTRACT

An apparatus and a method for accessing a plurality of memory blocks is disclosed. The An apparatus comprises: a memory circuit configured to store a recording table, wherein the recording table corresponds to quality index of the plurality of memory blocks; and a control circuit configured to group the plurality of memory blocks to a first memory group and a second memory group according to the quality index; to enable to access the memory blocks in the first memory group, and to disable to access the memory blocks in the second memory group.

16 Claims, 3 Drawing Sheets

DATA STORAGE DEVICE AND OPERATION METHOD OF THE SAME

CROSS-REFERENCE TO RELATED APPLICATION

This non-provisional application claims priority under 35 U.S.C. § 119(a) to Patent Application No. 107111047 in Taiwan, R.O.C. on Mar. 29, 2018, the entire contents of which are hereby incorporated by reference.

BACKGROUND

Technical Field

The present invention relates to a data storage device, and in particular, to an access method of a flash memory.

Related Art

The solid-state disk (SSD) does not require a mechanical shaft and a read head, so it does not cause damage due to severe vibration during operation, and the speed of data reading can be greatly improved. However, the main impact on the life of flash memory in the storage device (e.g. SSD) is the number of reading and writing operations. Among them, the number of reading and writing operations of flash memory will gradually increase the read error rate of the storage device, which in turn causes the quality of the storage device to deteriorate.

In addition, the quality of the internal memory cells of the storage device is typically different due to process variations, resulting in large differences in the quality of the internal memory cells. However, the excessive differences in the quality of internal memory cells can cause many problems. For example, unexpected data loss, reduced lifetime, longer overall memory access time, higher probability of memory access failures, even more unexpected error handling such that storage device is out of control. A conventional method typically directly indicates the inability to use low quality of memory cells and avoid the actual access to these memory cells. However, this conventional method ensures that the quality of the internal memory cells that can be used is relatively consistent to overcome the above problems; however, this would result in wastage of these memory cells.

Therefore, how to design a memory control device and method can balance the access efficiency and usage rate of memory cells of the flash memories, can improve the life of the flash memories and reduce the excessive differences in the quality of the cells of the flash memories, and can reduce the management burden of the storage device (e.g. SSD) management firmware. It is an urgent problem to be solved in the industry.

SUMMARY

In an embodiment, an apparatus for accessing a plurality of memory blocks is disclosed. The apparatus comprises: a memory circuit configured to store a recording table, wherein the recording table corresponds to quality index of the plurality of memory blocks; and a control circuit configured to group the plurality of memory blocks to a first memory group and a second memory group according to the quality index; to enable to access the memory blocks in the first memory group, and to disable to access the memory blocks in the second memory group.

In an embodiment, a method for accessing a plurality of memory blocks is disclosed. The method comprises: storing a recording table, wherein the recording table corresponds to quality index of the plurality of memory blocks; grouping the plurality of memory blocks to a first memory group and a second memory group according to the quality index; enabling to access the memory blocks in the first memory group, and disabling to access the memory blocks in the second memory group.

The invention has the advantages that the first memory unit with higher quality is accessed by first suppressing the second memory unit with poor quality when the storage device is initially operated. The achievement can effectively solve the adverse effects caused by the large difference in the quality of the flash memory, and achieve the best access performance. Further, after the first memory unit is accessed for a long time and the quality of the first memory unit is reduced to substantially close (/equal to) the quality of the second memory unit, the first and the second memory units are simultaneously accessed for optimal use.

BRIEF DESCRIPTION OF THE DRAWINGS

The present invention will become more fully understood from the detailed description given herein below for illustration only, and thus are not limitative of the present invention, and wherein.

DETAILED DESCRIPTION

The "couple" or "connect" used in this specification may mean that two or more components are mutually directly used as entities or in electrical contact, or are mutually indirectly used as entities or in electrical contact. The "couple" or "connect" may also mean that two or more components mutually operate or act.

Figure 1:
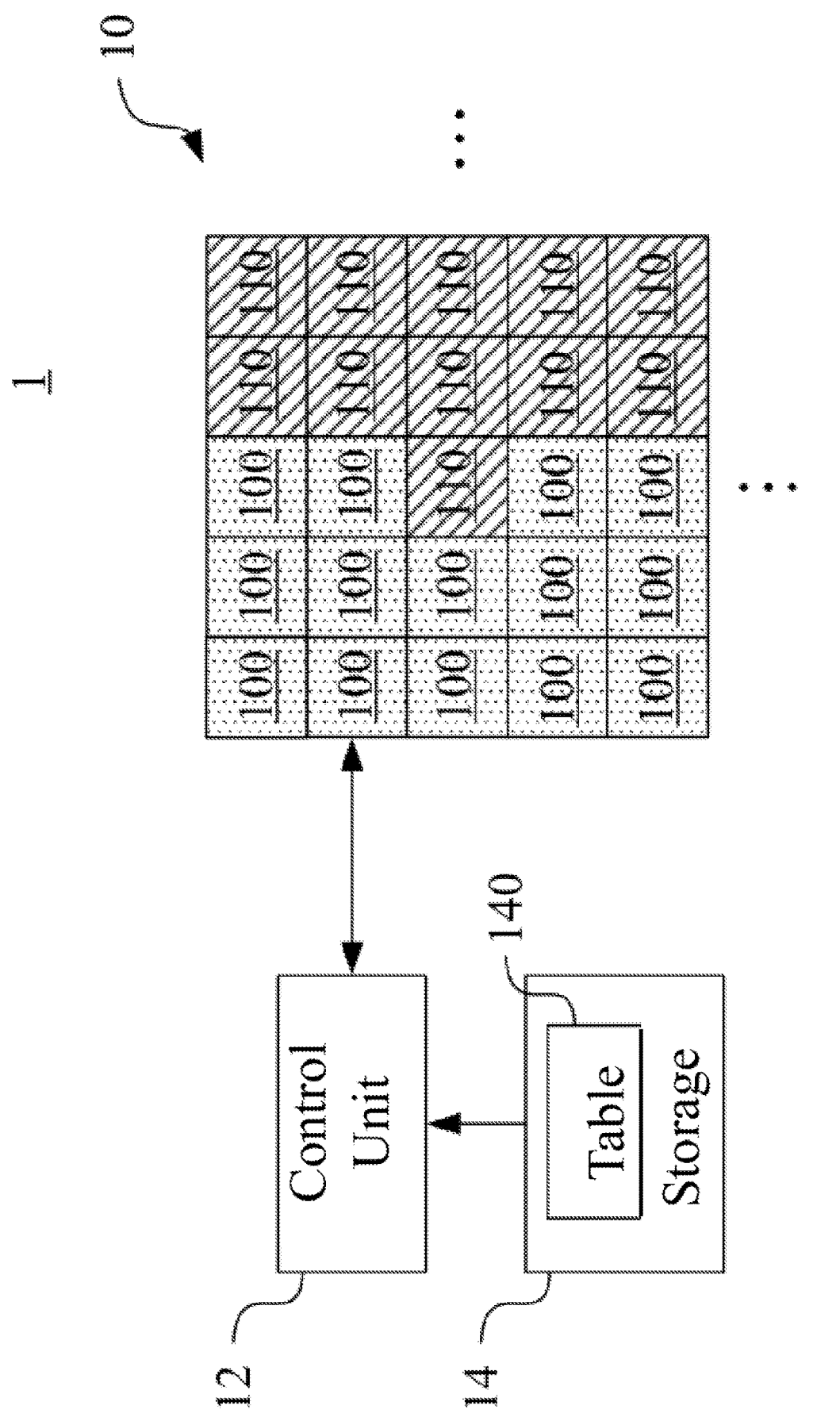
FIG. 1 is a block diagram of the storage device (e.g. SSD) according to an embodiment of the present invention.

Please refer to FIG. 1. FIG. 1 is a block diagram of a storage device 1 in an embodiment of the present invention. The storage device 1 includes a plurality of memory units 10, a control unit 12, and a storage unit 14. In one embodiment, the memory units 10 are, for example, but not limited to, NAND flash memory.

The memory units 10 each have a physical address and are configured to store data. The control unit 12 is electrically coupled to the memory units 10. In one embodiment, the storage device 1 can be coupled to a host system (not shown) having a processor. The processor can access the storage device 1 through the interface of the host system to transmit the command to the control unit 12, and the control unit 12 accesses the memory unit 10 via an internal interface of the storage device 1, and then transmits it to the host system via the interface of the host system.

The control unit 12 divides the memory units 10 into a plurality of first memory units 100 and a plurality of second memory units 110 according to a quality indicator (QI). The plurality of first memory units 100 have better quality, and the quality of the plurality of first memory units 100 is superior to the quality indicator; the plurality of second The quality of the memory units 100 is worse than the quality indicator. In the FIG. 1, the first memory units 100 is shown as a dot area, and the second memory units 110 is shown as a diagonal line area.

The first memory units 100 and the second memory units 110 have at least one operational parameter in the case of operation. In one embodiment, the operational parameter is an average read error rate of each memory unit. In one embodiment, the memory units 10 is divided into a first memory units 100 and a second memory units 110 according to the operational parameter.

For example, the memory units 10 whose operational parameter is in the threshold range will be divided into the first memory unit 100, and the memory units 10 whose operational parameter is not in the threshold range will be divided into the second memory units 110. Taking the average read error rate as an example, the above-mentioned threshold range means that the average read error rate of the first memory unit 100 is less than one threshold value. Rather than being in the threshold range, it means that the operational parameter of the second memory unit 110 is not less than this threshold.

In an embodiment, the storage device 1 can perform a read test in a test phase to obtain an operational parameter, further distinguishing the first memory units 100 and the second memory units 110. In another embodiment, the storage device 1 can access the memory units 10 at an initial stage of actual operation to obtain an operational parameter, further distinguishing the first memory units 100 and the second memory units 110. In another embodiment, the control unit 12 checks whether the storage unit 14 includes a record table 140, wherein the storage unit 14 has a record table 140 for recording a physical address of the first memory units 100 and/or the second memory units 110. If the control unit 12 finds that the storage unit 14 does not include the record table 140, the control unit 12 accesses the memory units 10 to distinguish the first memory units 100 and the second memory units 110. Finally, the record table 140 will record the distinguish result.

Due to the semiconductor process, the quality of the memory units 10 will vary greatly, with different operational values. Taking the average read error rate as an example, the quality of the first memory units 100 having a lower average read error rate will be superior to the quality of the second memory units 110 having a higher average read error rate.

Accordingly, the control unit 12 is configured to enable access to the first memory unit 100 and to disable access to the second memory unit 110 according to the record table 140.

In an embodiment, the storage unit 14 is configured to store a record table 140 configured to record a physical address of each of the second memory units 110. When the host accesses the storage device 1, the control unit 12 allows access to the first memory units 100 according to the record table 140, and does not allow access to the second memory unit 110 to achieve the functions of enabling the first memory units 100 and disabling the second memory units 110, respectively. That is, the record table 140 is an inhibition list. In another embodiment, the record table 140 can be an enable list. In another embodiment, the record table 140 also records the operational parameter of all the memory units, and the control unit 12 gradually adjusts the threshold range according to the situation in which the operational parameter of the first memory units 100 is gradually changed to achieve the stepwise enabling of the second memory units 110 in batches.

Further, when the first memory units 100 are in operation, the control unit 12 continues to determine whether the operational parameter of the first memory units 100 are not within the threshold range.

In an embodiment, taking the average read error rate as an example, when the first memory units 100 are in operation, the control unit 12 will record the total number of error bits of the first memory units 100 such that the control unit 12 can calculate an average read error rate based on the total number of error bits over a period of time and the number of times the first memory cell was read during that time period.

Since the first memory unit 100 operates for a long time, it will wear out and the average read error rate will increase. When the average read error rate of the first memory unit 100 is not less than the threshold value (that is, when the operational parameter are not in the threshold range), the quality of the first memory unit 100 will be close to the quality of the second memory unit 110. Thus, the control unit 12 will be enabled to allow access to second memory unit 110. At this time, when the control unit 12 performs access, the first memory unit 100 and the second memory unit 110 can be arbitrarily accessed.

In an embodiment, the control unit 12 removes the physical address of each second memory unit 110 from the record table 140 stored by the storage unit 14 to allow access to the second memory unit 110.

In an embodiment, the record table 140 records the physical address of each second memory unit 110 and the corresponding average read error rate. Since the first memory unit 100 operates for a long time, it will wear out and the average reading error rate will increase. The control unit 12 finds whether the average read error rate of each of the second memory units 110 is lower than the average read error rate of the first memory unit 100. and removing the physical address of second memory unit 110 whose average read error rate is lower than the average read error rate of the first memory unit 100 from the storage unit 14 such that the second memory unit 110 having a lower average read error rate is regarded as the first memory unit 100.

Therefore, during the first phase, the storage device 1 of the present invention can first disable the second memory unit 110 of poor quality to access the first memory unit 100 of higher quality to improve the access performance of the storage device 1. During a second phase after the first phase, after the first memory unit 100 is used for a long time and the quality is reduced to be equivalent to the second memory unit 110, the second memory unit 110 is re-enabled to achieve an optimal usage rate.

Figure 2:
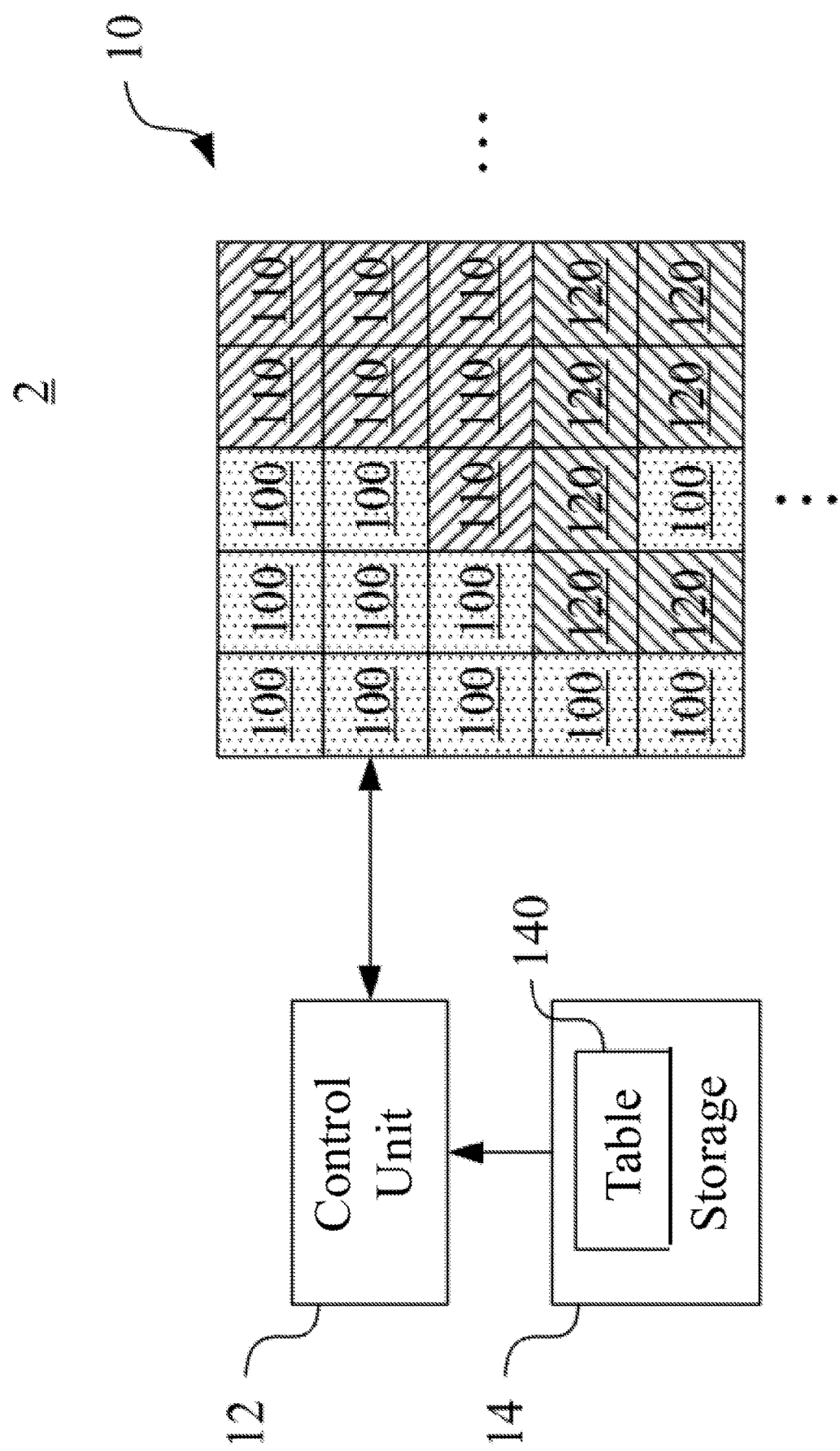
FIG. 2 is a block diagram of the storage device according to an embodiment of the present invention.

Please refer to FIG. 2. FIG. 2 is a block diagram of a storage device 2 in accordance with an embodiment of the present invention. Similar to the storage device 1 of FIG. 1, the storage device 2 includes a plurality of memory units 10, a control unit 12, and a storage unit 14. Therefore, the same elements and their functions will not be described again in this embodiment.

In the present embodiment, the control unit 12 divides the memory unit 10 into a plurality of first memory units 100, a plurality of second memory units 110, and a plurality of third memory units 120. In the second figure, the first memory unit 100 is depicted as a dot area, the second memory unit 110 is depicted as a diagonal line area, and the third memory unit 120 is depicted by a back oblique line area.

Therefore, the control unit 12 can further distinguish the first memory unit 100 with the best quality, the second memory unit 110 with the second best quality, and the third memory unit 120 with the poor quality by the two threshold ranges of the operational parameters.

The control unit 12 can first disable the second memory units 110 and the third memory units 120, and after the first memory units 100 operates for a long time, the quality of the first memory units 100 is reduced to be equivalent to the quality of the second memory units 110, enabling The second memory units 110. Further, the control unit 12 enables the third memory units 120 after the first memory units 100 and the second memory units 110 operate for a long time and the quality of the memory units 100 and 110 are reduced to correspond to the quality of the third memory units 120.

In other embodiments, the control unit 12 can also selectively divide the memory unit 10 into other numbers of groups to perform the suppression and enabling of multiple groups of memory units by multiple threshold ranges. Achieve optimal access performance and usage.

Figure 3:
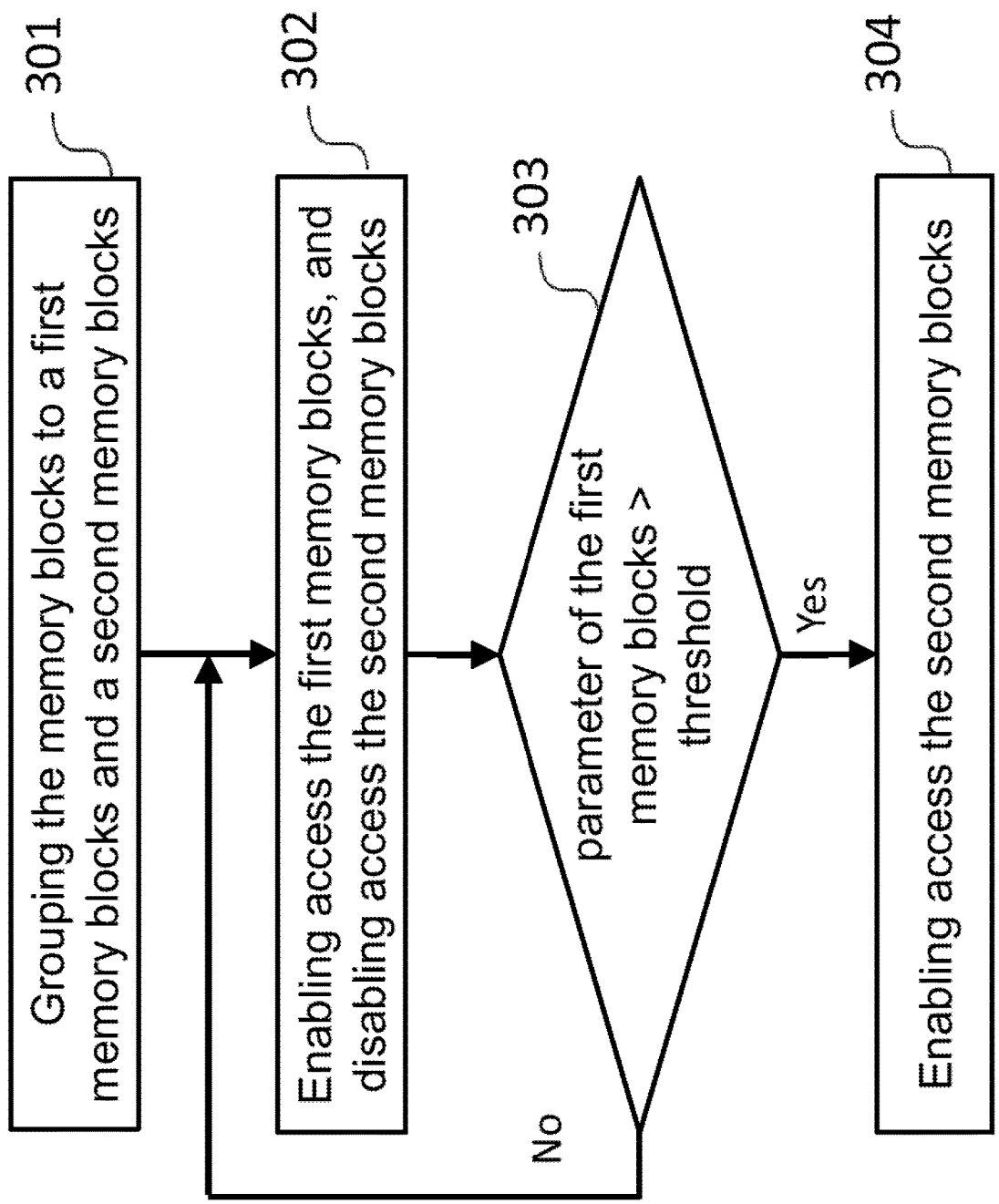
FIG. 3 is a flowchart of a method for operating the storage device according to another embodiment of the present invention.

Please refer to FIG. 3. FIG. 3 is a flow chart of a method 300 for controlling a storage device according to an embodiment of the present invention. The memory control method 300 can be applied to the storage device 1 of FIG. 1. The memory control method 300 includes the following steps (it should be understood that the steps mentioned in the present embodiment can be adjusted according to actual needs, except for the order in which they are specifically stated, or even simultaneously or partially simultaneously carried out).

In step 301, the memory unit 10 of the storage device 1 is divided into a first memory unit 100 and a second memory unit 110. The operational parameter of the first memory unit 100 is in the threshold range, and the operational parameter of the second memory unit 110 are not in the threshold range.

In step 302, the control unit 12 of the solid state drive 1 is to enable access to the first memory unit 100 and to disable access to the second memory unit 110.

In step 303, when the first memory unit 100 is in operation, the control unit 12 determines whether the operational parameter of the first memory unit 100 is not within the threshold range. When the operating parameter of the first memory unit 100 is in the threshold range, the flow returns to step 302.

In step 304, after the operational parameter of the first memory unit 100 is not within the threshold range, the control unit 12 enables to allow access to the first memory unit 100 and the second memory unit 110.

According to the conventional method, at least a portion of the second memory units 110 are distinguished by the present invention will be regarded as an unusable memory unit, and the remaining part of the second memory unit 110 are distinguished by the present invention will be regarded as a usable memory unit. In the case where at least a portion of the second memory unit 110 is to be regarded as an unusable memory unit according to the conventional method, the present invention can effectively increase the entire memory; in the case where the remaining part of the second memory unit 110 will be regarded as a usable memory unit according to the conventional method, the present invention can effectively solve the problem of excessive quality difference between usable memory units. In fact, it can balance the access performance and usage rate of solid state drives.

It should be noted that the above embodiments all use the average read error rate as an example of operational parameters. In other embodiments, the operational parameters may also be an erase time, a write time, a read time, or a data save time. In some embodiments, the combination of the above parameters may also be used as a basis for judging the quality of the memory unit.

The above description is only the preferred embodiment of the present invention and is not intended to limit the present invention, and any modifications, equivalent substitutions and improvements made within the principles of the present invention should include the present invention. Within the scope of protection.

Other embodiments of this invention will be apparent to those skilled in the art from consideration of the specification and practice of this invention disclosed herein. It is intended that the specification and examples be considered as exemplary only, with a true scope and spirit of the invention being indicated by the following claims.

What is claimed is:

1. An apparatus for accessing a plurality of memory blocks, the apparatus comprising:
    a memory circuit configured to store a recording table, wherein the recording table corresponds to quality index of the plurality of memory blocks;
    a control circuit, coupled to the memory circuit and to the plurality of memory blocks, configured to access the plurality of memory blocks;
    wherein the control circuit is configured to:
        group the plurality of memory blocks to a first memory group and a second memory group according to the quality index of the plurality of memory blocks;
        enable to access the memory blocks in the first memory group, and to disable to access the memory blocks in the second memory group;
        calculate quality of the memory blocks in the first memory group to generate a calculated quality corresponding to the first memory group;
        determine whether to enable to access at least one of the memory blocks in the second memory group according to the calculated quality; and
        enable access to at least one of the memory blocks in the second memory group based on an average error rate of the at least one memory blocks in the second memory group being lower than an average error rate of the memory blocks of the first memory group and updating a physical addresses of the at least one memory blocks in the second memory group, such that they are regarded as being in the first memory group.

2. The apparatus of claim 1, wherein information stored in the recording table comprises a plurality of physical address of the memory blocks in the first memory group.

3. The apparatus of claim 1, wherein information stored in the recording table comprises a plurality of physical address of the memory blocks in the second memory group.

4. The apparatus of claim 1, wherein the control circuit compares the calculated quality with a threshold, and determines whether the recording table needs to be updated according to the comparison result.

5. The apparatus of claim 4, wherein the control circuit configured to gradually adjust the value of the threshold.

6. The apparatus of claim 5, wherein the control circuit configured to achieve the stepwise enables the memory blocks of the second memory group in batches.

7. The apparatus of claim 5, wherein the quality index includes at least one of an read error rate, an erase time, a write time, a read time, and a data save time.

8. The apparatus of claim 1, wherein the control circuit configured to group the plurality of memory blocks to the first memory group, the second memory group, and a third memory group according to the quality index of the plurality of memory blocks.

9. A method for accessing a plurality of memory blocks, the method comprising:
   providing a recording table from a memory circuit, wherein the recording table corresponds to quality index of the plurality of memory blocks;
   grouping the plurality of memory blocks to a first memory group and a second memory group according to the quality index of the plurality of memory blocks;
   enabling access the memory blocks in the first memory group, and disabling access the memory blocks in the second memory group;
   determining whether to enable to access at least one of the memory blocks in the second memory group according to the calculated quality; and
   enabling access to at least one of the memory blocks in the second memory group based on an average error rate of the at least one the memory blocks in the second memory group being lower than an average error rate of the memory blocks of the first memory group and updating a physical addresses of the at least one memory blocks in the second memory group, such that they are regarded as being in the first memory group.

10. The method of claim 9, further comprising
   calculating quality of the memory blocks in the first memory group to generate a calculated quality corresponding to the first memory group; and
   determining whether to enabling to access at least one of the memory blocks in the second memory group according to the calculated quality.

11. The method of claim 9, wherein information stored in the recording table comprises a plurality of physical address of the memory blocks in the second memory group.

12. The method of claim 9, further comprising:
   comparing the calculated quality with a threshold; and
   determining whether the recording table needs to be updated according to the comparison result.

13. The method of claim 9, further comprising:
   gradually adjusting the quality index of the plurality of memory blocks according to the calculated quality.

14. The method of claim 9, wherein the memory blocks of the second memory group are sequentially batch-enabled.

15. The method of claim 9, wherein the quality index includes at least one of an read error rate, an erase time, a write time, a read time, and a data save time.

16. The method of claim 9, wherein the plurality of memory blocks is grouped to the first memory group, the second memory group, and a third memory group according to the quality index of the plurality of memory blocks.

* * * * *